(12) United States Patent
O'Neill

(10) Patent No.: US 6,410,897 B1
(45) Date of Patent: Jun. 25, 2002

(54) METHOD AND APPARATUS FOR AIRCRAFT PROTECTION AGAINST MISSILE THREATS

(75) Inventor: Mary Dominique O'Neill, Santa Barbara, CA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/671,765

(22) Filed: Sep. 27, 2000

(51) Int. Cl.[7] .......................... G01C 21/02; G01J 5/02; G01B 11/26; F41G 7/00
(52) U.S. Cl. .................. 250/203.6; 244/3.16; 250/342; 356/139.05
(58) Field of Search .............................. 244/3.16, 3.13; 250/526, 342, 203.6; 356/139.05, 139.06

(56) References Cited

U.S. PATENT DOCUMENTS

| 3,944,167 A | * | 3/1976 | Figler et al. ............... 244/3.16 |
| H101 H | * | 8/1986 | Walker |
| 5,061,930 A | * | 10/1991 | Nathanson et al. ............ 342/13 |
| 5,510,618 A | * | 4/1996 | Blecha et al. ................ 250/332 |
| 5,742,384 A | * | 4/1998 | Farmer ..................... 356/141.4 |

OTHER PUBLICATIONS

B. Keirstead et al, J. Electronic Defense, V. 15, N. 5, May 1992.*

* cited by examiner

*Primary Examiner*—Stephen C. Buczinski
(74) *Attorney, Agent, or Firm*—William C. Schubert; Glenn H. Lenzen, Jr.

(57) ABSTRACT

A two-color infrared warning device, having both wide-angle and narrow-angle search capabilities, and a directional countermeasure device are mounted on a gimbal pointing in the same direction. The warning device and gimbal are initially operated in a wide-angle, step-stare mode to search for threats. When a potential hostile target is found, the warning device changes to a narrow-angle mode to determine whether the potential target is hostile. When a hostile target is identified, the directional countermeasure device, which is pointed at the target by virtue of its mounting with the warning device on the gimbal, is activated.

12 Claims, 2 Drawing Sheets

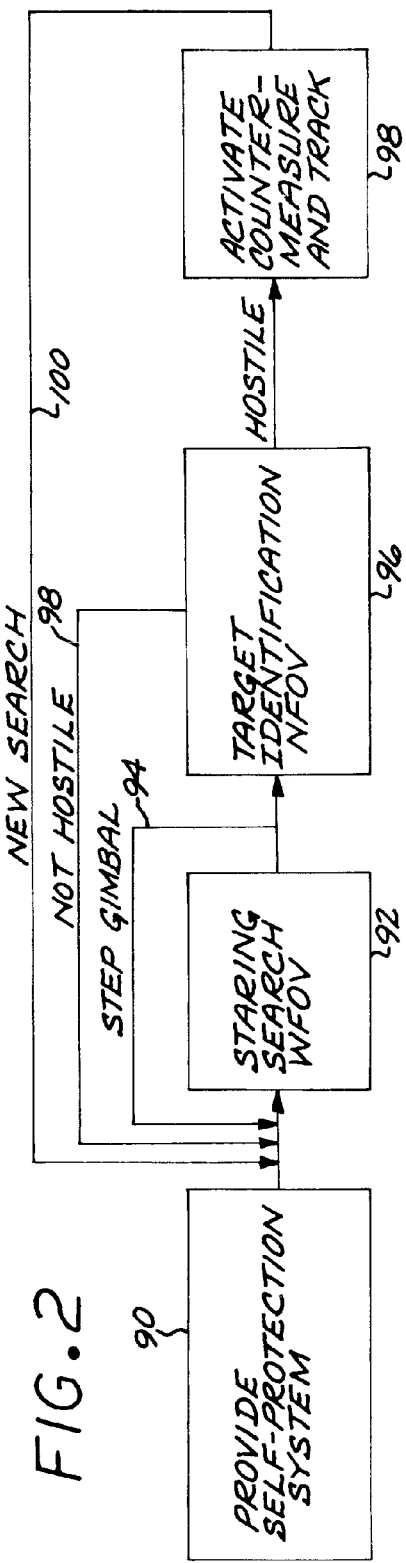

METHOD AND APPARATUS FOR AIRCRAFT PROTECTION AGAINST MISSILE THREATS

BACKGROUND OF THE INVENTION

This invention relates to the protection of aircraft against missile threats, and, more particularly, to a method and apparatus for locating, identifying, and taking action against hostile targets such as missiles.

Missiles fired at aircraft are usually guided either by a light seeker or by radar. Of the various types of seekers, infrared light seekers pose some of the greatest problems to aircraft defense. Unlike radar seekers, infrared seekers are passive and do not emit a detectable signal prior to the firing of the missile. Pilots therefore have little warning of their presence prior to the firing of the missile. Infrared-guided missile systems are relatively inexpensive, and human-portable units are widely available.

There has been a continuing effort to develop sensor systems and countermeasures that are carried on aircraft and are used to detect missile threats, particularly infrared-guided missiles, and take action against the missile threats. The sensor system must be effective to detect the infrared signature of a relatively small-sized missile at as great a distance as possible, in order to allow time for the countermeasure to be effective. In one approach, a wide-angle, two-color staring sensor system has been suggested to be particularly effective in detecting threats. This approach is limited by its low resolution and thence its ability to detect potential targets at great distances and susceptibility to smearing of the image, as well as the incomplete status of the detector technology. Additionally, the detection and warning components of the system must be integrated with the countermeasures components of the system.

There is an ongoing need for an improved approach to the protection of aircraft against missile threats and the like. The present invention fulfills this need, and further provides related advantages.

SUMMARY OF THE INVENTION

The present invention provides a method and apparatus for the self-protection of aircraft against missile threats. The approach integrates a search, detection, and identification unit, combined with a directional countermeasure device. Searching is accomplished with high resolution over a large angular range to identify potential targets. Upon finding a potential target, narrow-angle viewing is performed to-determine whether the potential target is hostile. If the target is hostile, the directional countermeasure device, which is pointing at the hostile target by virtue of its being mounted on the gimbal of the searching apparatus, is utilized against the hostile target. The entire apparatus fits within a small form factor, and is fully automatic in its operation.

An aircraft self-protection system comprises a gimbal platform, and a gimbal-platform servo controller that receives an input signal from the gimbal platform and provides a stabilization command to the gimbal platform. A lens/detector unit is mounted on the gimbal platform. The lens/detector unit includes a two-color infrared detector having an output signal, a wide-angle lens system having a scene energy input from a pointing direction and a wide-angle-lens output beam focused onto the two-color infrared detector, and a narrow-angle lens system having the scene energy input from the pointing direction and a narrow-angle-lens output beam focused onto the two-color infrared detector. The lens/detector unit also includes a controllable optical switch having as inputs the wide-angle-lens output beam and the narrow angle-lens output beam, and an optical switch output beam, and a beam splitter (preferably a dichroic reflector) that splits the optical switch output beam into a first-color beam that falls onto a first-color region of the two-color infrared detector and a second-color beam that falls onto a second-color region of the two-color infrared detector. A directional countermeasure device (preferably a laser that upsets the seeker of an incoming missile threat) is mounted on the gimbal platform and is aimed in the pointing direction. An electronics unit mounted off the gimbal platform receives the output signal of the two-color infrared detector, analyzes the output signal, and provides command signals to the gimbal-platform servo controller, the two-color infrared detector, and the optical switch. The electronics unit desirably includes tracking logic which, in a searching mode of operation, commands the gimbal-platform servo controller to perform a repeating step-stare tracking mode of operation.

A method for protecting an aircraft uses a self-protection system mounted on a controllable gimbal. The self-protection system comprises a lens/detector unit having a wide-angle lens system, a narrow-angle lens system, a two-color separator that selectably receives scene energy from the wide-angle lens system or the narrow-angle lens system, and a two-color infrared detector that receives the scene energy in two colors from the two-color separator. The self-protection system also includes a directional countermeasure device. The apparatus described above is preferably employed as an integrated unit, for affordability. The method includes the step of searching for a target using the lens/detector unit by the repeated steps of viewing a viewed portion of a scene through the wide-angle lens system using the infrared detector in a staring mode, analyzing the viewed portion of the scene for the presence of a potential target, and, if no potential target is found, stepping the gimbal to a new portion of the scene, and thereafter repeating the steps of viewing, analyzing, and stepping until the potential target is located at a target location in the step of analyzing. Upon finding the potential target at the target location in the step of searching, the method includes the steps of identifying the target by switching the lens/detector unit to the narrow-angle lens system, so that the two-color infrared detector views the potential target at the target location through the narrow-angle lens system, and determining the nature of the potential target as either hostile or not hostile. Upon determining that the potential target is not hostile, the step of searching is repeated. Upon determining that the potential target is hostile, the directional countermeasure device aimed at the hostile target is activated. The aiming of the directional countermeasure device at the target is maintained in the narrow-angle mode as long as targeting is required.

This step-stare approach achieves a substantially greater resolution than possible with a staring system, because the lens/detector is stepped across the field of regard and also because the view may be changed from a wide angle to a narrow angle during the acquisition and identification process. The sensor is used in a wide-angle mode to make the initial acquisition of the potential target, and then switched to the narrow-angle mode for further identification and targeting. The present apparatus operates autonomously and does not require separate guidance by the aircraft itself.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a block flow diagram of a method for protecting an aircraft; and

FIG. 3 is a chart of a typical step-stare pattern.

DETAILED DESCRIPTION OF THE INVENTION

Figure 1:
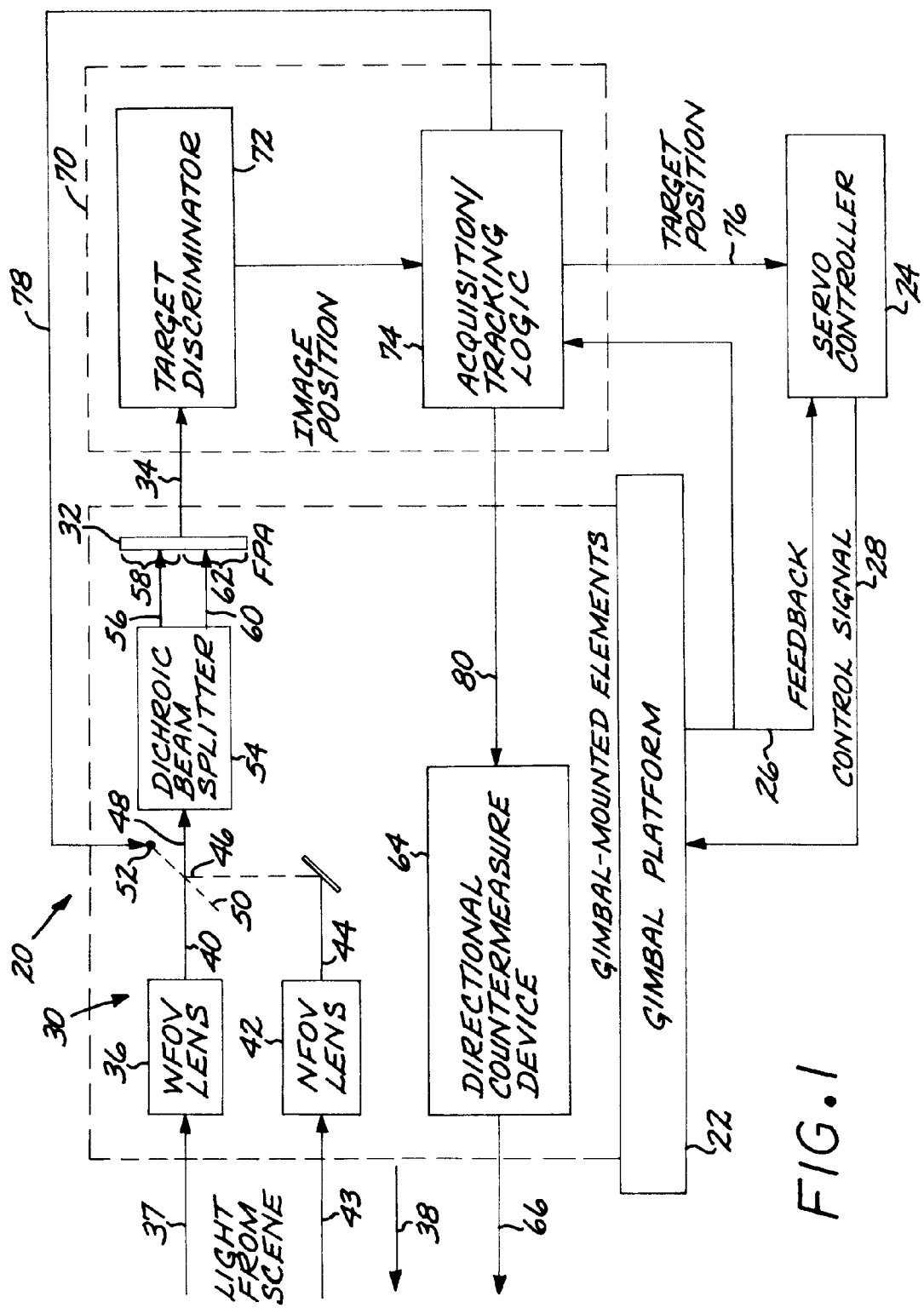
FIG. 1 is a block diagram of an apparatus according to the invention.

FIG. 1 depicts an aircraft self-protection system 20, which is a preferred embodiment of the present invention. The self-protection system 20 includes a gimbal platform 22 upon which some of the other elements are mounted. The gimbal platform 22 may be of any operable type, such as a roll/nod, x-y, or elevation-over-azimuth gimbal. The positioning of the gimbal platform 22 is controlled with a closed-loop servo system. A gimbal-platform servo controller 24 receives an input signal 26 from the gimbal platform 22 and provides a stabilization command and control signal 28 to the gimbal platform 22.

A lens/detector unit 30 is mounted on the gimbal platform 22, so that it may be pointed by the movement of the gimbal platform 22. The lens/detector unit 30 includes a two-color infrared detector 32 having an output signal 34 that carries the image of the scene. The detector 32 is preferably an infrared focal plane array (FPA) detector, which construction is known in the art. The term "two-color" means that the detector is able to process light of two different colors within an infrared wavelength band to which the detector is sensitive. It does not suggest that the detector must be able to produce separate output signals at two different specific wavelengths from broad spectrum light that impinges upon the detector.

The lens/detector unit 30 includes two different lens systems and a means to select between them for input to the detector 32. A wide-angle (wide field of view, or WFOV) lens system 36 has a scene energy input beam 37 parallel to a pointing direction 38 and a wide-angle-lens output beam 40 focused onto the two-color infrared detector 32. A narrow-angle (narrow field of view, or NFOV) lens system 42 has a scene energy input beam 43 from the pointing direction 38 and a narrow-angle-lens output beam 44 focused onto the two-color infrared detector 22.

A controllable optical switch 46 has as an input the wide-angle-lens output beam 40 and the narrow-angle-lens output beam 44, and an optical switch output beam 48. The optical switch 46 is illustrated as a mirror 50 that may be moved into the beam path by a motor 52. When the mirror 50 is in a retracted position, the wide-angle-lens output beam 40 is directed to the detector 32. When the mirror 46 is moved to intercept the light path, the wide-angle-lens output beam 40 is blocked and the narrow-angle-lens output beam 44 is reflected to the detector 32.

A beam splitter 54 splits the optical switch output beam 48 into a first-color beam 56 that falls onto a first-color region 58 of the two-color infrared detector 32, and a second-color beam 60 that falls onto a second-color region 62 of the two-color infrared detector 32. The beam splitter 54 may be of any operable type. It is preferably a dichroic beam splitter, but it could be a conventional beam splitter with an arrangement of mirrors and filters.

A directional countermeasure device 64 is mounted on the gimbal platform 22 and has an output beam 66 aimed in the pointing direction 38. The output beam 66 of the directional countermeasure device 64 is thus aimed coaxially with the respective input light beams 37 and 43 to the lens systems 36 and 42. In a practical device the maximum separation between the various beams 37, 43, and 66 is at most a few inches, so they are essentially coaxial and collinear. The directional countermeasure device 64 may be of any operable type. It is preferably a laser that upsets the seeker detector of a missile.

An electronics unit 70 for the lens/detector unit 30 is mounted off the gimbal platform 22. The electronics unit 70 includes a target discriminator 72 which receives the output signal 34 carrying the two different color images produced by the two-color infrared detector 32 and analyzes the output signal 34 to identify potential targets in the image. For example, the target discriminator removes clutter from the image by digital filtering, and identifies features that may be potential targets. Techniques for performing target discrimination are known in the art for other purposes and are not part of the present invention. The target discriminator 72 provides this information to an acquisition/tracking logic device 74, which is also part of the electronics unit 70. The acquisition/tracking logic device 74 directs the lens/detector unit 30 to aim more precisely at the potential target and switch to a mode of operation that allows more precise identification, as required. The acquisition/tracking logic device 74 provides a set-point command signal 76 to the servo controller 24 that causes the gimbal platform 22 to aim the pointing direction 38 at the potential target. The acquisition/tracking logic device 74 also sends a command signal 78 to the optical switch 46 to cause it to switch to the narrow-angle-lens output 44. The potential target may be thereby better identified.

Based upon the additional information gained in the narrow-angle mode, the acquisition/tracking logic device 74 determines whether the target under examination is hostile. Such techniques are known in the art for other purposes, and are not part of the present invention. If it is judged to be hostile, the acquisition/tracking logic device 74 activates the directional countermeasure device 64 by a command signal 80.

FIG. 2 illustrates in greater detail the method used to protect the aircraft. A self protection system mounted on a controllable gimbal is provided, numeral 90. The self-protection system comprises a lens/detector unit having a wide-angle lens system, a narrow-angle lens system, a two-color separator that selectably receives scene energy from the wide-angle lens system or the narrow-angle lens system, and a two-color infrared detector that receives the scene energy in two colors from the two-color separator, and a directional countermeasure device. The self-protection system 20 described above is preferred, and reference will be made in the following discussion to its elements.

The apparatus searches for a target using the lens/detector unit 30 by the repeated steps of viewing a viewed portion of a scene through the wide-angle lens system 36 in the WFOV mode using the infrared detector 32 in a staring mode, numeral 92. The viewed portion of the scene is analyzed for the presence of a potential target. If no potential target is found, the gimbal platform 22 is stepped to a new portion of the scene, numeral 94. The steps of viewing and analyzing (step 92) and stepping (step 94) are repeated until the potential target is located at a target location in the step of analyzing.

The step-scan approach of steps 92 and 94 is particularly effective because it allows a very wide field of regard while a high spatial resolution is maintained. An example of a scanning raster is shown in FIG. 3. The gimbal platform 22 is sequentially stepped in the pattern 1, 2, etc. as shown, with the stepping halted for a sufficient time to perform a staring view of the scene in each of the stepped angular locations. The raster is repeated upon reaching the last position, here indicated as position 32. In a design presently favored by the inventor, the detector 32 has a total view of 50×50 degrees, but is limited to a view of 50×25 degrees because it views two colors. Integration time during each staring step 92 is about 0.5 milliseconds. As the detector 32 is being read out, the gimbal platform steps to the next location on the raster. The image is moved 48 degrees in each step, so that there is a 2 degree overlap to account for any errors in gimbal pointing and the like. The result is that complete coverage over a 2.2π steradian field of regard is accomplished in about 0.5 seconds, unless a potential target is identified which causes the self-protection system to move to step 96. With a 512×512 FPA array in the detector 32, the pixel size is 1.4 milliradians. For an integration time of about 0.5 milliseconds, a detection range for a typical missile of about 22 kilometers is expected.

Upon finding the potential target at the target location in the step of searching, step 92, the target is identified, numeral 96, by switching the lens/detector unit 30 to the narrow-angle lens system 42 (NFOV mode) and aiming the pointing direction 38 toward the potential target location so that the input beam 43 is received from the potential target location. The two-color infrared detector 32 views the potential target at the target location through the narrow-angle lens system 42. The electronics unit 70 is employed to evaluate the nature of the potential target as not hostile or hostile. This evaluation is by techniques known in the art for other applications, such as the infrared signature and emissions of the potential target, its size, and its pattern of movement. Upon determining that the potential target is not hostile, the step 92 of searching is repeated, numeral 98.

Upon determining that the potential target is hostile, the directional countermeasure device 64 is activated, numeral 98. The directional countermeasure device 64 is already aimed at the hostile target by virtue of the fact that its output beam 66 is aimed in the pointing direction 38, the same direction from which the beam 43 is received. While the target being identified and the directional countermeasure device 64 is activated, the command 76 is used to cause the gimbal platform 22 to track the target so that the countermeasure pointing direction 66 remains locked onto the target. Upon disposition of the target, a new search is started, numeral 100, by returning to step 92.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An aircraft self-protection system, comprising:
a gimbal platform;
a gimbal-platform servo controller that receives an input signal from the gimbal platform and provides a stabilization command to the gimbal platform;
a lens/detector unit mounted on the gimbal platform, the lens/detector unit including
a two-color infrared detector having an output signal,
a wide-angle lens system having a scene energy input from a pointing direction and a wide-angle-lens output beam focused onto the two-color infrared detector,
a narrow-angle lens system having the scene energy input from the pointing direction and a narrow-angle-lens output beam focused onto the two-color infrared detector,
a controllable optical switch having as inputs the wide-angle-lens output beam and the narrow-angle-lens output beam, and an optical switch output beam, and
a beam splitter that splits the optical switch output beam into a first-color beam that falls onto a first-color region of the two-color infrared detector and a second-color beam that falls onto a second-color region of the two-color infrared detector;
a directional countermeasure device mounted on the gimbal platform and aimed in the pointing direction; and
an electronics unit mounted off the gimbal platform, the electronics unit receiving the output signal of the two-color infrared detector, analyzing the output signal, and providing command signals to the gimbal-platform servo controller and to the optical switch.

2. The self-protection system of claim 1, wherein the beam splitter comprises a dichroic reflector.

3. The self-protection system of claim 1, wherein the directional countermeasure device comprises a laser.

4. The self-protection system of claim 1, wherein the electronics unit includes tracking logic which, in a searching mode of operation, commands the gimbal-platform servo controller to perform a repeating step-stare tracking mode of operation.

5. The self-protection system of claim 1, wherein the infrared detector comprises a focal plane array.

6. A method for protecting an aircraft, comprising the steps of:
providing a self-protection system mounted on a controllable gimbal, the self-protection system comprising
a lens/detector unit having a wide-angle lens system, a narrow-angle lens system, a two-color separator that selectably receives scene energy from the wide-angle lens system or the narrow-angle lens system, and a two-color infrared detector that receives the scene energy in two colors from the two-color separator, and
a directional countermeasure device;
searching for a target using the lens/detector unit by the repeated steps of
viewing a viewed portion of a scene through the wide-angle lens system using the infrared detector in a staring mode,
analyzing the viewed portion of the scene for the presence of a potential target, and, if no potential target is found
stepping the gimbal to a new portion of the scene, and thereafter
repeating the steps of viewing, analyzing, and stepping until the potential target is located at a target location in the step of analyzing;
upon finding the potential target at the target location in the step of searching, identifying the target by
switching the lens/detector unit to the narrow-angle lens system, so that the two-color infrared detector views the potential target at the target location through the narrow-angle lens system, and
determining the nature of the potential target as not hostile or hostile; and
upon determining that the potential target is not hostile, repeating the step of searching, and
upon determining that the potential target is hostile, activating the directional countermeasure device aimed at the hostile target.

7. The method of claim 6, wherein the self-protection system comprises:

a gimbal platform;

a gimbal-platform servo controller that receives an input signal from the gimbal platform and provide a stabilization command to the gimbal platform;

the lens/detector unit mounted on the gimbal platform, the lens/detector unit including the two-color infrared detector having an output signal, the wide-angle lens system having a scene energy input from a pointing direction and a wide-angle-lens output beam focused onto the two-color infrared detector, the narrow-angle lens system having the scene energy input from the pointing direction and a narrow-angle-lens output beam focused onto the two-color infrared detector, a controllable optical switch having as an input the wide-angle-lens output beam and the narrow angle-lens output beam, and an optical switch output beam, and a beam splitter that splits the optical switch output beam into a first-color beam that falls onto a first-color region of the two-color infrared detector and a second-color beam that falls onto a second-color region of the two-color infrared detector;

the directional countermeasure device mounted on the gimbal platform and aimed in the pointing direction; and an electronics unit mounted off the gimbal platform, the electronics unit receiving the output signal of the two-color infrared detector, analyzing the output signal, and providing command signals to the gimbal-platform servo controller and to the optical switch.

8. The method of claims 6, wherein the directional countermeasure device comprises a laser.

9. An aircraft self-protection system, comprising:

a gimbal platform;

a gimbal-platform servo controller that receives an input signal from the gimbal platform and provides a stabilization command to the gimbal platform;

a lens/detector unit mounted on the gimbal platform, the lens/detector unit including a two-color infrared detector having an output signal, a wide-angle lens system having a scene energy input from a pointing direction and a wide-angle-lens output beam focused onto the two-color infrared detector, a narrow-angle lens system having the scene energy input from the pointing direction and a narrow-angle-lens output beam focused onto the two-color infrared detector, and a controllable optical switch having as inputs the wide-angle-lens output beam and the narrow-angle-lens output beam, and an optical switch output beam;

a directional countermeasure device mounted on the gimbal platform and aimed in the pointing direction; and an electronics unit receiving the output signal of the two-color infrared detector, analyzing the output signal, and providing command signals to the gimbal-platform servo controller and to the optical switch.

10. The self-protection system of claim 9, wherein the beam splitter comprises a dichroic reflector.

11. The self-protection system of claim 9, wherein the directional countermeasure device comprises a laser.

12. The self-protection system of claim 9, wherein the electronics unit includes tracking logic which, in a searching mode of operation, commands the gimbal-platform servo controller to perform a repeating step-stare tracking mode of operation.

* * * * *